UNITED STATES PATENT OFFICE.

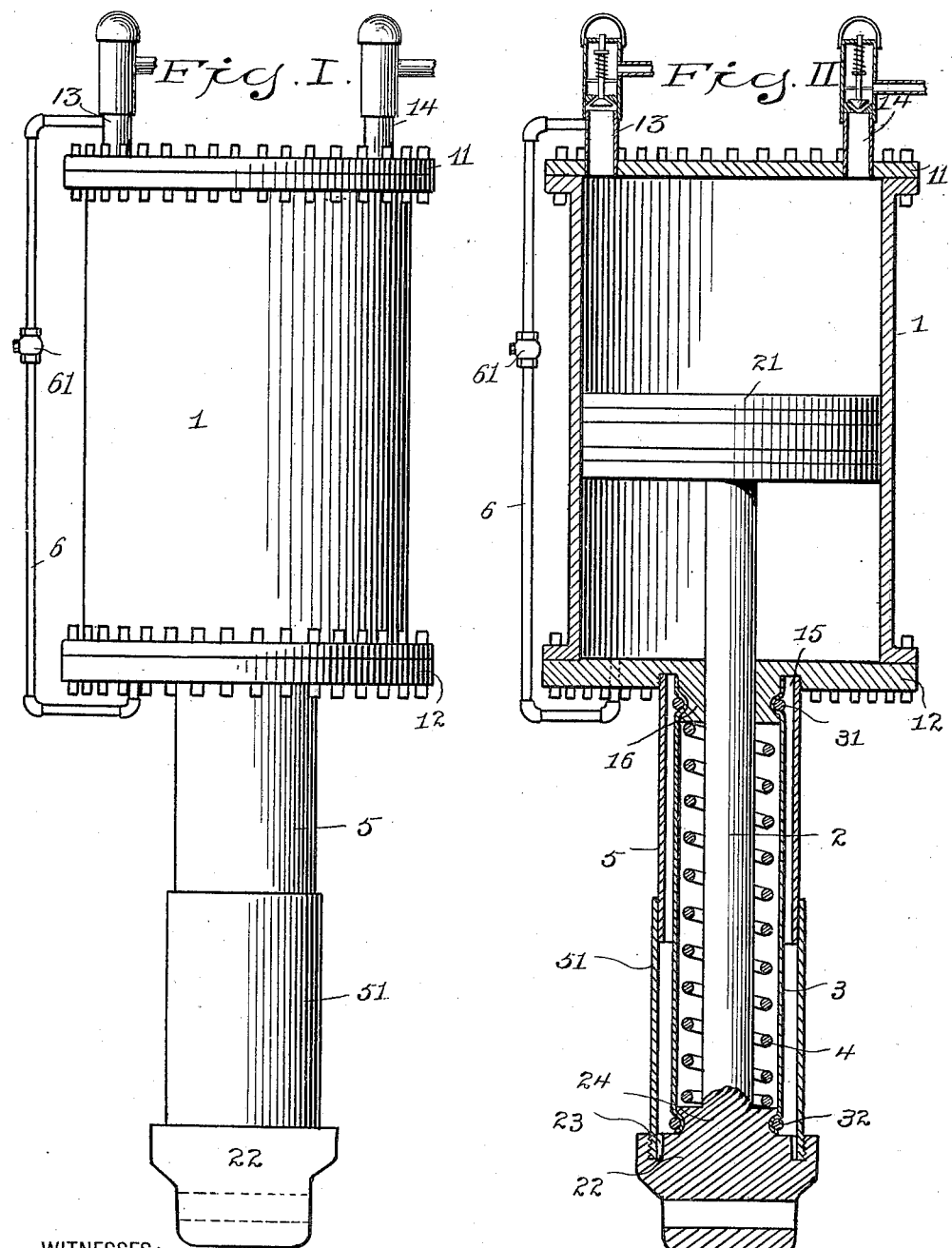

WILLIAM F. SINGER, OF NEW YORK, N. Y., ASSIGNOR TO THE SINGER AUTOMATIC ICE MACHINE COMPANY, OF JERSEY CITY, NEW JERSEY.

COMPRESSOR.

SPECIFICATION forming part of Letters Patent No. 679,343, dated July 30, 1901.

Application filed November 15, 1900. Serial No. 36,612. (No model.)

*To all whom it may concern:*

Be it known that I, WILLIAM F. SINGER, a citizen of the United States, residing at Fourth avenue and Twenty-eighth street, borough of Manhattan, city and State of New York, have invented a new and useful Improvement in Compressors, of which the following is a specification.

My invention relates chiefly to compressors—*e. g.*, single-acting force-pumps—such as are used to compress or liquefy refrigerating-gases with the object of preventing the escape of such gases into the surrounding atmosphere without retarding or interfering with the efficient action of the compressor.

In the accompanying drawings, Figure I is an elevation, and Fig. II a vertical section, of a compressor embodying my invention.

1 designates a cylinder provided with a head 11, having an inlet 13 and outlet 14, and a second head 12, having an annular recess 15 and annular grooved portion 16; 2, a piston-rod provided with piston 21 and cross-head 22, the latter having an annular recess 23 and annular grooved portion 24; 3, a flexible tube secured in position around the grooved portions 16 and 24 by clamping-rings 31 32; 4, a spring; 5 51, tubular parts forming a telescoping casing; 6, a return-pipe provided with a check-valve 61 and connecting the chambers of the cylinder at the respective sides of the piston.

In the example of my invention illustrated the head 11 of the cylinder 1 is provided with the usual suction-inlet 13 and discharge-pipe 14, each provided with any well-known form of valve, which while shown do not require description. The pump shown being single-acting, the other head 12 serves as a guide for the piston-rod. This head 12 is solid and is bored for the passage of the rod 2 and tightly bolted to the cylinder-body 1. As shown, it is provided with an internally-threaded annular recess 15 and a protruding portion the outer surface of which has an annular groove 16. The piston 21 may be formed and packed in any desired manner. The cross-head 22 at the free end of the rod 2 is formed with a threaded annular recess 23, similar to but of somewhat larger diameter than the recess 15 in the head 12, and with an annular-grooved portion 24, which may be like that shown in the cylinder-head. Surrounding the piston-rod 2 is a helical spring 4, which is normally long enough to cover the entire length of that portion of the rod 2 which passes out of the cylinder. Inclosing this portion of the rod 2, as well as the spring 4, is a flexible sleeve or envelop 3, which may be of rubber fabric or of any desired gas-tight material. It is secured by means of the clamping-rings 31 32 around the grooved portions 16 and 24 in the head 12 and cross-head 22, respectively, and is adapted to extend and contract with the outward and inward movement of the piston-rod 2. Screwed into the recess 15 in the cylinder-head 12 is a casing-tube section 5, and into the similar recess 23 in the cross-head 22 is a second casing-tube section 51, adapted, as shown, to slide freely over the smaller tube 5. A return-pipe 6, exterior to the cylinder 1, leads from the "dead" or non-operative end of the cylinder preferably to the inlet or suction pipe 13, as shown, and is provided with a check-valve 61.

In the operation of my device it is of course clear that at each backward stroke of the piston a fluid is drawn into the cylinder through the suction-pipe 13 past the valve 17, and at each forward stroke the fluid is discharged under pressure through the outlet 14 past the valve 18, simultaneously closing the valve 17. It is also apparent that no accuracy of fit or care in packing the piston 21 will suffice to prevent a slight leakage of gas past the piston. This gas is costly, unpleasantly odorous, or even dangerous, and it is practically impossible to make a sliding fit so tight as to prevent its escape. I therefore provide and secure to the cylinder-head 12 one end of the extension rubber or other gas-tight sleeve or envelop, the other end of which is secured at or near the free end of the piston-rod, as hereinbefore described. With this construction any gas which passes out of the cylinder with the piston-rod on its backward stroke will be contained within the rubber sleeve and will largely be forced back into the cylinder on the return stroke. To prevent the collapse and wear of the sleeve 3 against the rod 2, the coiled helical spring 4 is interposed as a support, and to confine the flexible sleeve and prevent its buckling or undue distension is the object of the telescoping case 5 51. If the gas which gradually accumulates behind the piston had no means of escape, it would at first check and afterward tend to stop the backward movement of the piston. The relief-tube 6, opening through the head 12, acts to carry off this accumulated gas to the inlet end of the cylinder or, as shown, to the inlet or suction pipe 13. Any well-known check or back-pressure valve 61 in the pipe 6 prevents movement of gas through the pipe in the reverse direction.

What I claim is—

1. In a pump of the class described, a cylinder, a reciprocating piston-rod, a head through which said rod passes, an extensible packing-sleeve surrounding said rod and secured at its fixed end to said head and at its other end to said piston-rod exterior to said head, and a telescopic casing surrounding said packing-sleeve, one portion of said casing being secured to said head and another portion to said piston-rod, substantially as described.

2. In a pump of the class described, a cylinder, a reciprocating piston-rod, a head through which said rod passes, an extensible packing-sleeve surrounding said rod and secured at its fixed end to said head and at its other end to said piston-rod exterior to said head, an extensible coiled spring interposed between said piston-rod and said packing-sleeve and a telescopic casing surrounding said packing-sleeve one portion of said casing being secured to said head and another portion to said piston-rod, substantially as described.

3. In a pump of the class described, a cylinder, a reciprocating piston-rod, a head through which said rod passes, a projecting portion on said rod exterior to said head, an extensible packing-sleeve and a telescoping casing surrounding said rod, said head and said projecting portion being each provided with means substantially as described for securing thereto the extensible packing-sleeve and a portion of the telescoping casing, substantially as set forth.

4. In a single-acting compressor-pump, a flexible envelop surrounding the piston-rod and hermetically sealed at its respective ends, a device within the envelop to prevent the same from collapsing upon the shaft and an extensible device surrounding the flexible envelop to protect the same from external injury and to limit the expansibility of the flexible envelop, substantially as specified.

WILLIAM F. SINGER.

Witnesses:
 GEO. L. COOPER,
 B. G. JONES.